United States Patent [19]

Csicsery

[11] 4,002,578
[45] Jan. 11, 1977

[54] CATALYST ACTIVATION PROCESS

[75] Inventor: Sigmund M. Csicsery, Lafayette, Calif.

[73] Assignee: Chevron Research Company, San Francisco, Calif.

[22] Filed: June 27, 1975

[21] Appl. No.: 591,089

[52] U.S. Cl. .......................................... 252/455 Z
[51] Int. Cl.² .......................................... B01J 29/06
[58] Field of Search .............................. 252/455 Z

[56] References Cited

UNITED STATES PATENTS

| | | | |
|---|---|---|---|
| 3,390,101 | 6/1968 | Csicsery | 252/455 Z |
| 3,842,016 | 10/1974 | Young | 252/455 Z |

Primary Examiner—Carl F. Dees
Attorney, Agent, or Firm—G. F. Magdeburger; R. H. Davies; D. L. Hagmann

[57] ABSTRACT

A method is disclosed for increasing the acid catalytic activity of a crystalline zeolitic aluminosilicate having a Group IIA cation as a substantial portion of its cations, having at least 6-Angstrom-sized pores and being substantially free of hydrogen cations. The activating procedure comprises in sequence a treatment with a reducing atmosphere followed by a treatment with an oxygen-containing gas, the former treatment being at a temperature above 700° C.

18 Claims, No Drawings

CATALYST ACTIVATION PROCESS

BACKGROUND OF THE INVENTION

1. Field of the Invention

This invention relates to a method for activating zeolitic compositions of matter suitable for use as catalysts for isomerizing or cracking hydrocarbons. More particularly, it relates to a sequential procedure for activating crystalline zeolitic aluminosilicates which contain at least one kind of alkaline earth cations as a substantial portion of its cationic requirements.

2. The Prior Art

Crystalline zeolitic aluminosilicates, often referred to as molecular sieves, of themselves or as components of a catalyst composite are now well known for their usefulness as catalyst for the conversion of hydrocarbons. Various methods have been disclosed for use in activating and/or improving the activities of these materials. There is, of course, no procedure which is generally suitable for the activation of all such catalysts. Whether or not an activation procedure is required and what the procedure should be is a matter which is intimately associated with each specific catalyst and one for which the requirements usually vary widely.

In U.S. Pat. No. 3,390,101 a method is disclosed for activating crystalline aluminosilicates in which at least 10% of the total sites available for cations must be occupied by hydrogen. The activation procedure comprises in sequence a reduction and an oxidation step in which the temperature for the reduction step is in the range 600° to 1400° F (315°–760° C), preferably 800°–1200° F (426°–648° C), and seldom exceeds 1400° F (760° C). The procedure of the present invention differs from the foregoing procedure in that a crystalline zeolitic aluminosilicate having an alkaline earth as a substantial portion of its cations, and being substantially free of hydrogen cations is modified or activated by at least one particular sequence of treating steps, including the use of a temperature in the reduction step which is in the range above 700° C and below a deactivating temperature (920° C).

SUMMARY OF THE INVENTION

In accordance with the present invention, the acid catalytic activity of a crystalline zeolitic aluminosilicate having at least 6-Angstrom-sized pores, containing at least one kind of alkaline earth (Group IIA) cation as a substantial portion of its cations, and being substantially free of hydrogen cations is increased by the sequence of steps:

1. subjecting the aluminosilicate while at a temperature in the range 700° to 920° C to a reducing atmosphere comprising hydrogen gas; and
2. Subjecting the aluminosilicate while at a temperature above 315° C to an oxidizing atmosphere comprising molecular oxygen gas, said subjectings each being for a period in the range from about 0.15 to 10 hours and said temperatures being below the temperature at which a substantial portion of the crystallinity of said aluminosilicate is destroyed.

The aluminosilicates to which the present method is directed are generally aluminosilicates having one or more kind of alkaline earth cations introduced in any suitable manner. For example, the alkaline earth cations may be incorporated in the zeolitic aluminosilicate by base exchange (see U.S. Pat. No. 3,669,903).

The catalysts activated by means of the present invention find utility in numerous hydrocarbon conversion processes. For example, the catalysts activated by the method of the present invention find use in processes where an acid catalytic activity is desired which is moderate relative to the acid catalytic activity corresponding to the H+ form of the present molecular sieves. Representative hydrocarbon conversions for which the alkaline earth-containing and activated sieves herein are useful as catalyst include alkylation, isomerization and disproportionation reactions. They are also useful as catalysts for alkanol dehydration for the production of olefins. The catalysts activated according to the present invention are especially useful in hydrocarbon cracking processes.

An object of the present invention is increasing the acid-catalytic activity of the crystalline zeolitic aluminosilicates for use in hydrocarbon processes wherein the properties of the aluminosilicates themselves, particularly, the acidic reaction sites of calcium-exchanged aluminosilicates, are important, and the presence of metals, or their ions or compounds, on the catalysts is only of importance insofar as said metals, their ions or compounds, contribute to the moderate acid acidity of the catalysts.

The cationic requirements in a preferred aspect of the aluminosilicates contemplated for use in the present invention are satisfied where little or no hydrogen ions are present and contain no appreciable hydrogenating metal components. It is surprising that the combination of steps, and especially the steps which involve contacting the aluminosilicates with a reducing atmosphere prior to contact with an oxidizing atmosphere, should provide more active catalysts than simply a calcination technique.

Both the natural and synthetic zeolitic aluminosilicates may be activated by the present process. The exact type of aluminosilicates is relatively unimportant as long as the pore structures comprise openings characterized by pore dimensions greater than 6 Angstroms and in particular, by uniform pore diameters of between approximately 6 and 15 Angstroms. The crystalline zeolitic aluminosilicates contemplated for use herein comprise aluminosilicate caged structures in which alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. Thus, the crystalline zeolitic aluminosilicates are often referred to as molecular sieves. In the hydrated form, the aluminosilicates can be represented by the formula:

$$M_{2/n}O:Al_2O_3 \cdot wSiO_2 \cdot yH_2O$$

where for present purposes M represents any one of a number of ions, such as, for example, the alkaline earth metal ions or rare earth ions; and at least about 50% (a substantial portion) of the ions represented by M are alkaline earth metal ions. In addition, alkali metal ions, that is less than 45%, preferably less than 20%, of the cationic content of the aluminosilicate, may be present as part of the residual cation fraction. In the formula above, the cation M balances the electrovalence of the tetrahedra; $n$ represents the valence of the cations; $w$, the mols of silicon dioxide; and $y$, the mols of water.

Desirably the cationic requirement of the present sieves includes little or no hydrogen cations. As a practical matter, it is virtually impossible to totally exclude the presence of hydrogen cations. Accordingly, the balance of the cations of the sieves herein includes a minor amount of such, and the amount, in general and depending upon the efficiency of the base-exchange method used for the introduction of the desired alkaline earth cations, may provide for less than 5% of the cationic requirement of the resulting activated sieves, but usually less than 1%.

In addition, the balance of the cationic requirement of the present sieves may include ions of hydrogenation component metals of Groups IV, VI and VIII which have been base-exchanged into the sieves herein by any suitable method ordinarily employed for this purpose.

Preferably, alkaline earth cations comprise at least 70% of the cationic requirement of the aluminosilicate. Of the alkaline earths (that is, magnesium, calciums, strontium, and barium) calcium is preferred.

A representative zeolitic aluminosilicate is for example, the synthesized zeolite X (see for example the description in U.S. Pat. Nos. 2,882,244 or 2,983,670) which has been base-exchanged with a suitable alkaline earth metal compound soluble in water, for example, calcium chloride or nitrate. Preferably the sieves herein are of the calcium X or Y type, that is, faujasite-type sieves.

The activated zeolites of this invention may be used alone or in admixture with other catalytically active or inactive components. In a particularly preferred embodiment, these zeolites form one component of the catalyst for the cracking of hydrocarbon oils, comprising the activated crystalline aluminosilicates of this invention embedded in a non-crystalline matrix comprising one or more refractory oxides, such as silica, alumina, magnesia, titania, and the like. The present activation process will ordinarily be carried out on the finished composite which should contain at least sufficient of the present alkaline earth modified sieves in order to provide a significant contribution to the overall catalytic effect of the composite. Such an amount will in general be in the range from about 10 to 90 weight percent of the composite, the balance being the admixed materials as noted above. Experiment has shown, however, that it is the crystalline component that is activated by the process of this invention and not the non-crystalline matrix.

For the purposes of the present invention, the nature of the metallic ion associated with the molecular sieve is critical. This ion must be a member of the alkaline earth group, that is, Group IIA as shown in the Periodic Chart of the Atoms (Welch Scientific Co.). Magnesium, calcium, and barium aluminosilicates have all been shown to respond to the activation procedure of this invention. The most pronounced response was that of the calcium aluminosilicate, and it is consequently the preferred species. The procedure herein is not effective for sieves wherein the cationic requirements are predominantly satisifed by zinc, thallous or sodium cations.

Since most molecular sieves are produced initially with alkali metal ions, for example sodium, as the cations, the restriction of this invention to alkaline earth sieves means that the alkaline earth cation must usually be introduced by an exchange procedure. The usual method for achieving this exchange is treatment of the alkali metal aluminosilicate with a solution, ordinarily aqueous, of a salt of the ion to be introduced, for example, magnesium chloride, calcium nitrate. It is often advantageous to repeat this treatment more than once with separation of the sieve from the partially spent solution between treatments. As final steps, the exchanged zeolite is frequently washed until free of counter ion, e.g., chloride or nitrate, and then dried. Procedures for exchanging the cations in molecular sieve are well recognized in the art.

If the alkaline earth aluminosilicate is to be incorporated into an amphorus matrix, as in a preferred embodiment of this invention, it is not necessary to dry the matrix separately. A convenient method of preparing such a matrix catalyst is to thoroughly mix the exchanged sieve with a slurry of a precipitated refractory oxide gel and to dry the resultant mixture. It is advantageous to use a gel that has been washed essentially free of undesired soluble metal ions in order to avoid back-exchange with the sieve. Alternatively, an alkali metal sieve can be mixed with the gel and the entire mixture exchanged with an alkaline earth metal cation. After mixing the alkaline earth sieve with a hydrated gel of one or more refractory oxides, the mixture is dried and subjected to the activation procedure of this invention. The refractory oxide matrix may comprise alumina, silica, titania, zirconia, boria, magnesia, and the like or mixtures of these oxides. Silica-alumina is a particularly preferred matrix and the relative amount of silica in a matrix may vary widely and in any suitable amount. Usually, the silica content of the silica-alumina mixture ranges from about 15 to 95 weight percent. Mixtures containing from 35 to 90 weight percent silica are more preferable. Depending on the intended use, as discussed above, the sieve should be present in the matrix in an amount at least sufficient to provide a significant catalytic effect.

It may be desirable, in some instances, that the alkaline earth-containing sieves herein or a matrix containing these sieves as described above also contain a hydrogenation metal component as described above except that one or more of these components is present as a disposed material, in addition to or as opposed to base-exchanged components. In this case, the disposition of these materials is effected in any suitable way ordinarily employed and known in the art.

The reducing step of the present activation procedure comprises subjecting the aluminosilicate sieve to a reducing atmosphere and temperature. The reducing atmosphere may suitably be carbon monoxide or such hydrocarbons as methane or ethane, but is preferably hydrogen. The reducing atmosphere should contain a minor amount of water vapor, but not a gross amount. That is, catalytic amounts of water vapor appear to promote the desired reducing atmospheric effect, whereas the effect of the presence of an excessive amount is clearly deleterious. The presence of as much as 40,000 ppm water vapor in a hydrogen reducing atmosphere has been found to be acceptable.

The temperature requirement in the conditioning of the aluminosilicate in the reducing atmosphere varies depending upon a number of factors, including the specific aluminosilicate being processed and the duration of the conditioning step. In general, a temperature in the range 700° to 920° C is required. Preferably the reducing temperature is in the range 761°–900° C, and more preferably 780°–875° C.

For satisfactory results the duration of the conditioning of the aluminosilicate under reducing conditions varies depending upon a number of factors, including the specific aluminosilicate being processed and the temperature employed for the reducing stage. In general, a satisfactory period for the conditioning under reducing conditions will be in the range from about 0.15 to 10 hours with the shorter times corresponding to the use of higher temperatures, preferably 0.25 to 5 hours. Longer conditioning times may be employed, particularly at the lower conditioning temperatures, but usually the use of extended times is undesirable from a standpoint of cost.

The required conditioning under oxidizing conditions is satisfactorily achieved at temperatures in the range from about 350° C and below the temperature at which a substantial portion of the crystallinity of the aluminosilicate is destroyed. Preferably this temperature is in the range 762° to 900° C. Satisfactory results are achieved when these temperatures are maintained for a period in the range from about 0.15 to 10 hours, preferably 0.25 to 5 hours, the shorter times corresponding to the higher temperatures.

In either case whether the conditions are reducing or oxidizing, a stream of a suitable gas is continuously passed through a bed of the zeolitic aluminosilicate for the required period of time. Because of the nature of the reaction between gaseous hydrogen and oxygen, it is prudent between the conditioning steps to purge the aluminosilicate material with a non-reactive gas, for example nitrogen, in order to eliminate the possibility of fire or explosion.

The oxidizing atmosphere is preferably an oxygen-containing gas. The oxygen-containing atmosphere may be diluted with suitable gases such as the inert gases for nitrogen. Air is satisfactory and is preferred for the purposes of this invention.

If desired, the reduction-oxidation cycle may be repeated more than once; and, in some cases there may be an advantage to proceeding in this fashion. Ordinarily, however, if the conditions have been properly chosen, a single reduction-oxidation cycle will suffice.

The activation procedure is complete at the end of the final oxidation step; however, some additional manipulations may be required to transfer the activated catalysts to the environment in which it is to be used. For example, if the catalyst is intended for use in an isomerization reaction where the usual atmosphere is hydrogen, it will be necessary to purge the catalyst as discussed above with an inert gas and then to displace the inert gas with hydrogen. On the other hand, if the catalyst is to be used for catalytic cracking of hydrocarbons, it will usually be added directly with the hydrocarbon feed.

EXAMPLES

The present invention will be more fully understood by reference to the following examples. It should be recognized that these examples are included to clarify the invention and in no way are intended to limit its scope.

EXAMPLE 1

A calcium-exchanged Y-type zeolite was prepared. The starting material was a commercially available sodium Y zeolite, Linde SK-40. As obtained from the supplier, it contained 3.5 meq of exchangeable sodium ion (dry basis).

165 g of the above zeolite was water washed and then exchanged with calcium chloride solution. The exchange solution was prepared by dissolving 4800 g of anhydrous calcium chloride in 6400 ml of deionized water to give 8 liters of final solution. The sodium zeolite was added to 1 liter of the exchange solution and stirred for 2 hours at 104° C. After standing overnight, the mixture was treated for an additional 2 hours at 104° C and then filtered and washed twice with deionized water.

The above sequence of steps was repeated 8 times. After the final treatment, the zeolite was washed until the wash waters no longer gave a test for chloride ion with silver nitrate solution. The zeolite was then dried in air for 4 days at 120° C. 148 g of final product was obtained containing 0.57% unexchanged sodium. The calcium Y zeolite was screened and the 60–100 mesh fraction used for subsequent testing.

EXAMPLE 2

Samples of the calcium Y zeolite described in Example 1 were subjected to various activation procedures and then tested for their ability to isomerize and disproportionate (i.e., transalkylate) 1-methyl-2-ethylbenzene. (See J. Org. Chem. 34, p. 3338, 1969). The test unit consisted of a downflow tubular reactor contained in a furnace whose temperature could be accurately controlled. The reactor was equipped with means for admitting hydrogen, air, inert gas, and liquid feed at controlled rates and for removing product samples for analysis. Activation of the catalyst and testing of its activity were both carried out in the same reactor.

In a typical run, a sample of the zeolite was mixed with an equal volume of inert solid, alundum, and charged to the reactor and heated in a flowing stream of hydrogen or air over a predetermined temperature schedule. The temperature was then adjusted to 315° C and 1-methyl-2-ethylbenzene pumped into the reactor at a rate of 4 ml of liquid per volume of sieve per hour. The tests were run at atmospheric pressure and a hydrogen-to-feed mol ratio of 5. A composite liquid sample was taken over a ½-hour period starting at the 27th minute of the run.

The product samples were analyzed by gas chromatography for their content of unreacted feed, the two other methylethylbenzene isomers, toluene, ethylbenzene and the higher alkylbenzenes ($C_{10}$–$C_{11}$). From the ratio of these components, it is possible to calculate the total conversion and the percentages of this conversion represented by isomerization, disproportionation and deethylation. The results are given in Table I.

TABLE I

| Test No. | Series Description | Activation of Calcium Y Zeolite | | | | | Total Conversion, Mol % |
|---|---|---|---|---|---|---|---|
| | | Individual Test No. | Pretreatment | | | | |
| | | | 1st gas | temp., ° C | 2nd gas | Temp., ° C | |
| I | $H_2$ Pretreatments | 101 | $H_2$ | 371 | None | — | 5.1 |
| | | 102 | $H_2$ | 787 | None | — | 8.5 |
| II | Air Pretreatments | 103 | Air | 482 | None | — | 9.2 |
| | | 104 | Air | 787 | None | — | 8.7 |

TABLE I-continued

| | | Activation of Calcium Y Zeolite | | | | | |
|---|---|---|---|---|---|---|---|
| Test No. | Series Description | Individual Test No. | Pretreatment | | | | Total Conversion, Mol % |
| | | | 1st gas | temp., °C | 2nd gas | Temp., °C | |
| III | Combined Pretreatments | 105 | $H_2$ | 482 | Air | 482 | 9.0 |
| | | 106 | $H_2$ | 648 | Air | 482 | 5.2 |
| | | 107 | $H_2$ | 787 | Air | 482 | 13.9 |
| | | 108 | $H_2$ | 842 | Air | 482 | 14.4 |
| | | 109 | $H_2$ | 842 | Air | 842 | 27.2 |

Test Series I was made to show the effect of hydrogen pretreatment alone at two temperature levels. The sieve showed some activity, but it was small. Series II made with air alone gave a result that was very similar to Series I.

Series III was made with a combination treatment, a 1-hour exposure to hydrogen followed by a 1-hour exposure to air. When both treatments were made at 482° C, Test No. 105, the result was not greatly different from air alone. With hydrogen at 648° C and air at 482° C, Test No. 106, the catalyst was less active than in Test No. 105. One would be tempted to label this an artifact, except that repeated experiments have shown a minimum in the extent of activation in the neighborhood of 648° C.

Test No. 107 shows the effect of treating first with hydrogen at 787° C and then with air at 482° C. Comparison with Tests No. 102 and 103 demonstrates that the conversion is distinctly higher than with either treatment alone. Tests No. 108 and 109 demonstrate the beneficial effect of further increases in temperature up to 842° C for both steps.

EXAMPLE 3

A similar series of runs was made using a sample of a commercially available calcium Y zeolite which analyzed 7.0% Ca and 0.8% Na. The run conditions were identical to those of Example 2 except that the pretreat temperature was held constant at 842° C and the duration of the pretreatments was varied. The results are given in Table II.

TABLE II

| | | Activation of Calcium Y Zeolite | | | |
|---|---|---|---|---|---|
| Test No. | Series Description | Pretreatment | | | Total Conversion, Mol % |
| | | Gas | Duration, hours | Temp., °C | |
| IV | $H_2$ Pretreatment | $H_2$ | 2.5 | 842 | 14.7 |
| V | Air Pretreatment | Air | 2.5 | 842 | 16.5 |
| VI | Combined Pretreatment | $H_2$ | 1.0 | 842 | |
| | | $N_2$ | 0.5 | 842 | 21.9 |
| | | Air | 1.0 | 842 | |
| VII | No Pretreatment | | none | | 0.8 |

Four runs were made, one with a hydrogen pretreatment only, one with an air pretreatment only, one with a combination of the two pretreatments, and a blank run was also made with no pretreatment. The combination run, VI, was made with a 1.0-hour hydrogen treatment, a 0.5-hour purge with $N_2$, and a 1.0-hour air treatment. Runs IV and V were made with 2.5-hour treatments so that the total time at the activating temperature was the same as in Run VI. As may be seen, the combination treatment again gave a higher conversion than either the oxidation or the reduction treatment alone. With no pretreatment, the catalyst was inactive.

EXAMPLE 4

A sample of an activated calcium Y zeolite in a silica-alumina matrix was prepared as follows. 227 kg of an aqueous solution of aluminum chloride containing 4.6% aluminum was charged to a 1.14-kiloliter glass kettle and diluted with 204 kg of water. To this was added 11.1 kg of glacial acetic acid. 47 kg of a sodium silicate solution containing 28.7% $SiO_2$ was diluted with 212.4 kg of water and added to the aluminum chloride solution in the kettle. 85 kg of commerical ammonium hydroxide was diluted with 172 kg of water and also added to the kettle. The mixture was stirred at 65° C for 2 hours. The pH was adjusted to about 6 with small additions of acetic acid and ammonium hydroxide; the final pH was 6.2. The mixture was cooled and filtered. The gel so obtained contained 7% dry solids consisting of 40% silica and 60% alumina.

8 kg of the above gel was washed 7 times at 65° C with a 1% solution of ammonium acetate. The volume of each wash was 16 liters, and the duration was 1 hour. The gel was filtered off between washes. It was finally washed once with 16 liters of distilled water. A sample of the gel dried to 70.8% solids had a sodium content of less than 100 ppm.

2826 g of the washed silica-alumina gel was slurried with 2000 ml of hot water in a glass vessel using a homogenizer to obtain good contact. A 109.3-g quantity of a calcium Y zeolite prepared essentially as in Example 1 was added, and the stirring continued for 1¾ hours. The slurry was transferred to glass dishes and dried for 64 hours at 194° C in a vacuum oven with a nitrogen bleed. From the known moisture contents of the starting materials, it could be calculated that the final product contained 23% zeolite on a dry basis.

The zeolite matrix catalyst was put through an oxidation-reduction cycle. It was first dried for 17 hours at 149° C in dry air. It was then purged with inert gas and heated in stages in a hydrogen atmosphere to 815° C. The total time of reduction was about 7 hours. The catalyst was cooled to 482° C, purged, and treated with air at that temperature for 15 hours. A final 4-hour reduction under hydrogen at temperatures up to 782° C completed this treatment. The purpose of the oxidation reduction cycles was to activate the zeolite; separate experiments had demonstrated that the treatment has little, if any, effect on the gel matrix.

The catalyst was screened and the 80-400 mesh material used for testing. Very little of the total product fell outside of this size range.

EXAMPLE 5

The effect of varying the temperature in the oxidizing step was demonstrated in runs in which the reducing temperature was maintained at 842° C and the duration of each step was 1 hour. The activity determination test was carried out as described in Example 2 above.

| | Temp., ° C, of Air Treatment | Total Conversion[1], mol % |
|---|---|---|
| 1) | 482 | 16.25 |
| 2) | 842 | 27.2 |

[1]Isomerization, transethylation and transmethylation

These data demonstrate that the temperature in both steps of the present process should be above 760° C. Therefore, both stages may be carried out at substantially the same temperature, which is a very convenient and desirable condition.

EXAMPLE 6

The catalyst of Example 4 was tested for its activity, selectivity and stability as a cracking catalyst. As a comparison, an identical test was run on a widely used commercial zeolitic catalyst, CBZ-1, supplied by Davison Chemical Division of W. R. Grace and Company. The feedstock for these runs was a mixture of gas oils from West Coast U.S.A. and Indonesian crudes having the following characteristics:

TABLE III

| Feedstock Characteristics | |
|---|---|
| Source of Feed | ⅓ Indonesian |
| | ⅔ California |
| Gravity, ° API | |
| Aniline Point, ° C | 72 |
| Sulfur, wt. % | 0.77 |
| Nitrogen, wt. % | 0.30 |
| ASTM D-1160 Distillation | |
| % Distilled, ° C | |
| St | 235 |
| 5 | 284 |
| 50 | 392 |
| 75 | 518 |
| EP | 521 |

The test were run in a fluid catalyst test unit patterned after the one described by Johnson and Stark in "Industrial and Engineering Chemistry", April 1953, p. 849. The heart of the unit is a conical vessel in which the catalyst can be fluidized and exposed to either the hydrocarbon to be cracked or to air for burning off coke. The vessel is equipped with suitable accessories for controlling temperature and feed rates and for collecting product samples. Analysis is by a combination of gas chromatography and distillation followed by the usual inspections. Samples of catalyst can also be withdrawn for the determination of coke.

The test unit is run on a fixed cycle comprising a 5-minute cracking period followed by purging and a coke burning period lasting approximately 1 hour. An initial catalyst charge of 300 g is used, and during the cracking period, gas oil is fed at a rate to 30 g/min and water at 2 g/min. Pressure is 1.68 atmospheres and temperature is varied, as described below. During regeneration, undiluted air is fed at a rate of 5800 ml/min STP; and the burn is started at 565° C. Ten alternate cracking and burning cycles constitute a test period.

Four test periods were run on each of the two catalysts, that of Example 5 and fresh CBZ-1. Since fresh catalysts are very active and tend to overcrack, the first period was run at a comparatively low temperature, 454° C. The catalysts were then treated at 760° C in 1 atmosphere of steam for 6 hours to deactivate them partially, and a second test period was run under the same conditions as the first. A third period was run at a temperature of 496° C. Finally, the catalyst was steamed again for 42 hours at 760° C and the fourth period run at 496° C. The steaming treatment, 48 hours in all, is severe and deactivates CBZ-1 substantially below the level usually tolerated in a commercial fluid cracker operating under equilibrium conditions.

The activity and stability of the catalysts can be evaluated by comparing the conversions obtained during the various test periods. This is done in Table V. The measure of conversion used is the liquid volume percent of the feed converted to products boiling below 221° C.

TABLE IV

| | Conversion - Liquid Volume Percent Boiling Below 221° C | | | |
|---|---|---|---|---|
| | Period | | | |
| | 1 | 2 | 3 | 4 |
| CBZ-1 | 59 | 49 | 56 | 28 |
| Catalyst of Example 5 | 72 | 56 | 62 | 36 |

The initial activity of the test catalyst is higher than that of the comparison catalyst, and it holds up better under severe deactivating treatment.

Somewhat different product distributions were obtained with CBZ-1 and the catalyst of this invention. The catalyst of this invention produces somewhat more middle distillate, coke and light gases, and somewhat less gasoline and heavy cycle oil (329° C+).

Octane numbers were measured on some of the gasoline fractions made during the test runs carried out at 496° C. The 60°–121° C fraction made with the catalyst of this invention gave F-2 Clear values about 2.5 numbers higher than that produced with CBZ-1. Both the F-2 Clear and the F-1 Clear numbers were about 0.5 higher on the 121°–221° C cuts.

The advantages of the present activating method are, in general, most evident when the catalyst preparation has had no prior use in hydrocarbon hydroconversion service.

What is claimed is:

1. A method of increasing the acid catalytic activity of a crystalline zeolitic aluminosilicate having at least 6-Angstrom-sized pores, containing at least one kind of alkaline earth cations, in an amount providing at least about 50% of the cationic requirement thereof, and having less than 1% of its cationic requirement furnished by hydrogen cations, which comprises a sequence of steps, including:
    1. subjecting said aluminosilicate while at a temperature in the range 700° to 920° C to a reducing atmosphere comprising hydrogen gas; and
    2. subjecting said aluminosilicate while at a temperature above about 315° C to an oxidizing atmosphere comprising molecular oxygen gas, said subjectings each being for a period in the range from about 0.15 to 10 hours and said temperatures being below the temperature at which a substantial portion of the crystallinity of said aluminosilicate is destroyed.

2. A method as in claim 1 further characterized in that said reducing step temperature is in the range 761° to 900° C.

3. A method as in claim 1 further characterized in that said reducing step temperature is in the range 780° to 875° C.

4. A method as in claim 1 further characterized in that said alkaline earth cations constitute at least 70% of the cations.

5. A method as in claim 1 further characterized in that said period is in the range from 0.25 to 5 hours.

6. A method as in claim 1 further characterized in that said cations consist essentially of one or more kinds of alkaline earth cations.

7. A method as in claim 1 further characterized in that said sieve is a faujasite-type sieve.

8. A method as in claim 1 further characterized in that said oxidizing temperature is in the range 761° to 900° C.

9. A method as in claim 1 further characterized in that the reducing and oxidizing steps are effected at substantially the same temperature, said temperature being in the range from about 780° to 875° C.

10. An activated catalyst composition obtained by the method of claim 6.

11. A method of increasing the acid catalytic activity of a crystalline zeolitic aluminosilicate having at least 6-Angstrom-sized pores, containing at least one kind of alkaline earth cations as a substantial portion of its cations, and being substantially free of hydrogen cations, which comprises a sequence of steps, including:
   1. subjecting said aluminosilicate while at a temperature of about 842° C to a reducing atmosphere comprising hydrogen gas; and
   2. subjecting said aluminosilicate while at a temperature of about 842° C to an oxidizing atmosphere comprising molecular oxygen gas,
   said subjectings each being for a period in the range from about 0.15 to 10 hours.

12. An activated catalytic composition obtained by the method of claim 11.

13. A method as in claim 1 further characterized in that said crystalline zeolitic aluminosilicate is included in a composite comprising an amorphous non-crystalline matrix of refractory oxides.

14. A method as in claim 13 further characterized in that said composite contains an amount of said crystalline zeolitic aluminosilicate in the range 10 to 90 weight percent.

15. A method as in claim 14 further characterized in that said matrix is silica-alumina having a silica content in the range 15 to 95 weight percent.

16. A method as in claim 1 further characterized in that said cationic requirement includes ions of hydrogenation component metals selected from Groups, IV, VI and VIII, said ion having been base exchanged into said zeolite.

17. A method of increasing the acid catalytic activity of a crystalline zeolitic aluminosilicate having at least 6-Angstrom-sized pores, containing at least one kind of alkaline earth cations in an amount providing at least about 50% of the cationic requirement thereof, and having less than 5% of its cationic requirement furnished by hydrogen cations, which comprises a sequence of steps, including:
   1. subjecting said aluminosilicate while at a temperature in the range 700° to 920° C to a reducing atmosphere comprising hydrogen gas; and
   2. subjecting said aluminosilicate while at a temperature above about 315° C to an oxidizing atmosphere comprising molecular oxygen gas,
   said subjectings each being for a period in the range from about 0.15 to 10 hours and said temperatures being below the temperature at which a substantial portion of the crystallinity of said aluminosilicate is destroyed.

18. A method as in claim 17 further characterized in that said cationic requirement includes ions of hydrogenation component metals selected from Groups IV, VI and VIII, said ions having been base exchanged into said zeolite.

* * * * *